US011665614B2

United States Patent
Dong et al.

(10) Patent No.: US 11,665,614 B2
(45) Date of Patent: May 30, 2023

(54) MULTI-ACCESS EDGE COMPUTING ASSISTED DEVICE STATE TRANSITIONS

(71) Applicant: Verizon Patent and Licensing Inc., Arlington, VA (US)

(72) Inventors: Yuexin Dong, Bridgewater, NJ (US); Yuk Lun Li, Morganville, NJ (US); Weimin Liu, Chatham, NJ (US); Indraneel Sen, Livingston, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/545,913

(22) Filed: Aug. 20, 2019

(65) Prior Publication Data

US 2021/0058846 A1 Feb. 25, 2021

(51) Int. Cl.
```
H04W 36/30      (2009.01)
H04M 15/00      (2006.01)
H04W 92/04      (2009.01)
H04W 36/00      (2009.01)
H04W 88/02      (2009.01)
H04W 4/70       (2018.01)
H04W 8/10       (2009.01)
H04W 88/18      (2009.01)
H04W 40/02      (2009.01)
H04W 52/02      (2009.01)
H04W 76/27      (2018.01)
```
(52) U.S. Cl.
CPC ... *H04W 40/023* (2013.01); *H04W 36/00837* (2018.08); *H04W 36/30* (2013.01); *H04W 52/0235* (2013.01); *H04W 76/27* (2018.02)

(58) Field of Classification Search
CPC .......... H04L 67/04; H04L 76/15; H04L 5/00; H04W 72/02; H04W 4/023; H04W 4/029; H04W 76/27; H04W 36/30; H04W 28/0247; H04W 88/02; H04W 72/04; H04W 56/0015
USPC ....................................... 370/338; 455/456.3
See application file for complete search history.

(56) References Cited

U.S. PATENT DOCUMENTS

| | | | |
|---|---|---|---|
| 2007/0157199 A1* | 7/2007 | Iwamoto | G06F 9/461 718/100 |
| 2015/0257093 A1* | 9/2015 | Uchino | H04W 76/28 370/311 |
| 2015/0327201 A1* | 11/2015 | He | H04W 8/005 370/336 |
| 2015/0365997 A1* | 12/2015 | Jeong | H04W 52/0251 370/311 |
| 2016/0309379 A1* | 10/2016 | Pelletier | H04W 24/08 |
| 2016/0330578 A1* | 11/2016 | Moussavian | H04L 47/2425 |
| 2018/0109590 A1* | 4/2018 | Rao | H04L 67/327 |
| 2019/0020657 A1* | 1/2019 | Egner | G06Q 20/3224 |

(Continued)

Primary Examiner — Khaled M Kassim
Assistant Examiner — Jason A Harley

(57) ABSTRACT

A network device in a Multi-Access Edge Computing (MEC) cluster is configured to: receive, from a wireless station, information associated with a User Equipment (UE) device that is wirelessly attached to a network through the wireless station and estimate a first time interval to complete a task for the UE device based on the information. If the first time interval is less than a threshold time interval, the processor is to: signal, through the wireless station, to the UE device to be in a connected state; execute the task; and send a result of the execution, through the wireless station, to the UE device.

20 Claims, 14 Drawing Sheets

(56) References Cited

U.S. PATENT DOCUMENTS

| | | | |
|---|---|---|---|
| 2019/0104434 A1* | 4/2019 | Duan | H04W 68/00 |
| 2019/0364492 A1* | 11/2019 | Azizi | H04W 48/16 |
| 2020/0053614 A1* | 2/2020 | Sun | H04W 76/20 |
| 2020/0136978 A1* | 4/2020 | Li | H04L 67/148 |
| 2020/0229130 A1* | 7/2020 | Keating | H04W 52/0229 |
| 2020/0249039 A1* | 8/2020 | Lassoued | G06N 20/00 |
| 2020/0275313 A1* | 8/2020 | He | H04W 28/0284 |
| 2020/0313837 A1* | 10/2020 | Vejlgaard | H04W 76/27 |
| 2021/0058846 A1* | 2/2021 | Dong | H04W 36/00837 |

* cited by examiner

FIG. 6

| | |
|---|---|
| $T_{UR}$ | ESTIMATED TIME, FROM UE DEVICE, OF THE NEXT MEC REQUEST |
| $T_N$ | ESTIMATED TIME, FROM UE DEVICE, OF THE NEXT REQUEST FOR NETWORK RESOURCE |
| $T_{COMP}$ | MEC COMPUTE TIME |
| $T_{COMP}(n)$ | COMPUTE TIME FOR THREAD $n$ ON MEC |
| $N_T$ | NUMBER OF THREADS TASK IS/CAN BE ASSIGNED |
| $T_{UL}$ | NETWORK UPLINK LATENCY |
| $T_{DL}$ | NETWORK DOWNLINK LATENCY |
| $T_{MEC2MEC}$ | TIME NEEDED TO MOVE STATE INFORMATION FROM ONE MEC TO ANOTHER MEC |
| $T_L$ | TOTAL END-TO-END LATENCY REQUESTED |
| $T_1$ | THRESHOLD FOR DETERMINING IF UE DEVICE SHOULD BE PLACED IN RRC_INACTIVE STATE |
| $T_2$ | TIME TO KEEP CONTEXT/STATE INFORMATION |
| $N_R$ | NUMBER OF RESOURCES AVAILABLE TO UE DEVICE |
| $R_{COMP}(n)$ | NUMBER OF RESOURCES NEEDED BY THREAD $n$ |
| $R_{COMP}$ | TOTAL RESOURCES NEEDED |

MULTI-ACCESS EDGE COMPUTING ASSISTED DEVICE STATE TRANSITIONS

BACKGROUND INFORMATION

In order to satisfy the needs and demands of users of mobile communication devices, providers of wireless communication services continue to improve available services. One enhancement made possible through new broadband cellular networks is the use of Multi-access Edge Computing (MEC) clusters (also referred to as Mobile Edge Computing clusters). The MEC clusters allow high network computing loads to be transferred onto edge servers. Depending on the location of the edge servers relative to the point of attachment (e.g., a wireless station for a User Equipment (UE) device), MEC clusters can provide various services and applications to UE devices with minimal latency.

BRIEF DESCRIPTION OF THE DRAWINGS

FIG. 6 shows a table of exemplary parameters that a MEC cluster of FIG. 1A or 1B may use in dynamically allocating its computational resources to optimally perform a task that is associated with state transitions of a UE device of FIG. 1A.

DETAILED DESCRIPTION OF PREFERRED EMBODIMENTS

The following detailed description refers to the accompanying drawings. The same reference numbers in different drawings may identify the same or similar elements.

Multi-access Edge Computing (MEC) is a collection of interconnected MEC networks. A service provider may implement a MEC network to provide faster services with less latency to user equipment (UE) devices, as well as less network congestion, enhanced processing, reduced backhaul, etc. Each MEC network may include multiple MEC clusters, and each MEC cluster may be located geographically close to the UE devices that the cluster services. The close proximity of the MEC cluster reduces the average latency of the services rendered by the MEC cluster.

Because signaling latency associated with MEC clusters is less than that associated with traditional core network components, a MEC cluster may be better at guiding UE devices to perform certain actions in an efficient manner than the core components. For example, consider three operational states (e.g., Radio Resource Control (RRC) states) that a UE device can enter: the RRC_CONNECTED state (or "RRC_ACTIVE" state), the RRC_INACTIVE state, and the IDLE state. By guiding a UE device to remain in or enter the RRC_INACTIVE state opportunistically, a MEC cluster may permit the UE device to conserve its battery power. In addition, by having the UE device remain in one of the three states based on its computational capabilities, the MEC cluster may allow the UE device to avoid having to switch back from a different state that it entered. This reduces the overall network signaling and the load associated with such signaling for each UE device. Given that there are hundreds of thousands or millions of UE devices that interact with a particular network, a reduction in signaling for each of the UE devices may significantly improve the overall performance of the network.

Figure 1A:
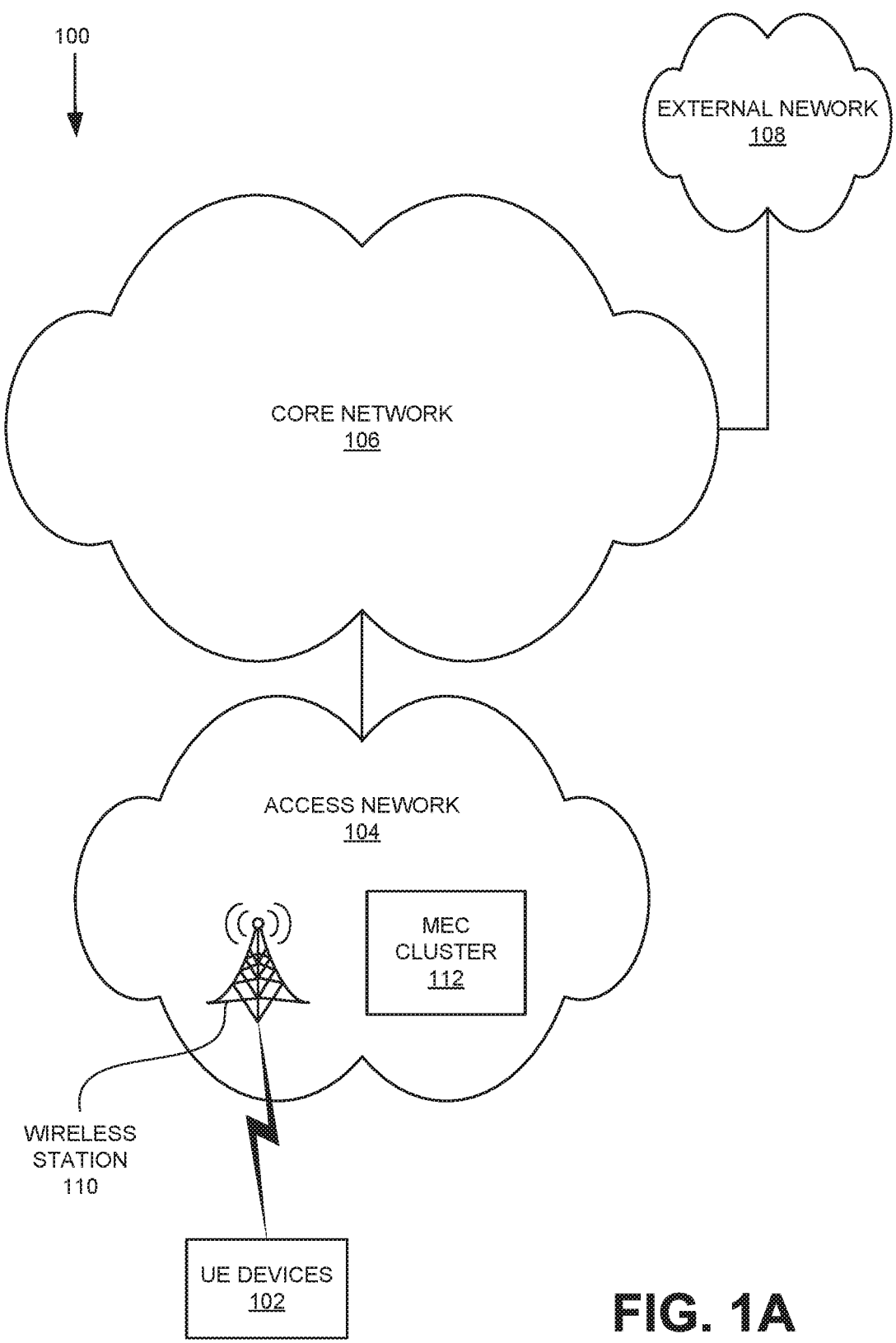
FIG. 1A illustrates an exemplary network environment in which the concepts described herein may be implemented.

FIG. 1A illustrates an exemplary network environment 100 in which the concepts described herein may be implemented. As shown, environment 100 may include UE devices 102 (referred to as "UE devices 102" or "UE device 102"), an access network 104, a core network 106 and an external network 108. For simplicity, FIG. 1A does not show all components that may be included in network environment 100 (e.g., routers, bridges, wireless access point, additional networks, additional UE devices, etc.). That is, depending on the implementation, network environment 100 may include additional, fewer, different, or a different arrangement of components than those illustrated in FIG. 1A.

UE device 102 may include a wireless communication device. Examples of a UE device 102 include: a smart phone; a tablet device; a wearable computer device (e.g., a smart watch); a global positioning system (GPS) device; a laptop computer; a media playing device; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 104.

In operation, UE device 102 may enter a particular state known as the RRC_CONNECTED state or the IDLE state. From these states, UE device 102 may enter or return to the RRC_INACTIVE state. By transitioning to and remaining in the RRC_INACTIVE state (e.g., by eliminating unnecessary state transitions), UE device 102 may improve its battery life and experience lower latency, due to less signaling involved in such state transitions.

Access network 104 may allow UE device 102 to connect to core network 106. To do so, access network 104 may establish and maintain, with participation from UE device 102, an over-the-air channel with UE device 102; and maintain backhaul channels with core network 106. Access network 104 may convey information through these channels, from UE device 102 to core network 106 and vice versa.

Access network 104 may include a Long-term Evolution (LTE) radio network and/or a Fifth Generation (5G) radio network or other advanced radio network. These radio networks may include many wireless stations, which are illustrated in FIG. 3 as wireless stations 110 for establishing and maintaining an over-the-air channel with UE device 102.

Wireless station 110 may include a Fourth Generation (4G), 5G, or another type of wireless station (e.g., eNB, gNB, etc.) that includes one or more radio frequency (RF) transceivers. Wireless station 110 (also referred to as base station 110) may provide or support one or more of the following: carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 104 may be part of an evolved UMTS Terrestrial Network (eUTRAN).

As shown in FIG. 1A, access network 104 may also include MEC clusters 112. Depending on the implementation, however, MEC clusters 112 may or may not be part of access network 104. In some implementations, MEC clusters 112 may be coupled to wireless stations 110 through a backhaul link (e.g., wired, wireless (e.g., radio/microwave), and/or optical link). Such MEC clusters 112 are geographically close to UE devices 102 that are attached to access network 104 via wireless station 110, and thus may be capable of providing services to UE devices 102 with a minimal latency. As described below in greater detail, MEC cluster 112 may aid UE devices 102 in entering or remaining in particular UE device states, such as the RRC_CONNECTED state or the RRC_INACTIVE state.

Core network 106 may include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 106 may allow the delivery of Internet Protocol (IP) services to UE device 102, and may interface with other networks, such as external network 108.

Depending on the implementation, core network 106 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network components.

External network 108 may include networks that are external to core network 106. In some implementations, external network 108 may include packet data networks, such as an Internet Protocol (IP) network. An IP network may include, for example, an IP Multimedia Subsystem (IMS) network that may provide a Short Messaging Service (SMS), Voice-over-IP (VoIP) service, etc.

Figure 1B:
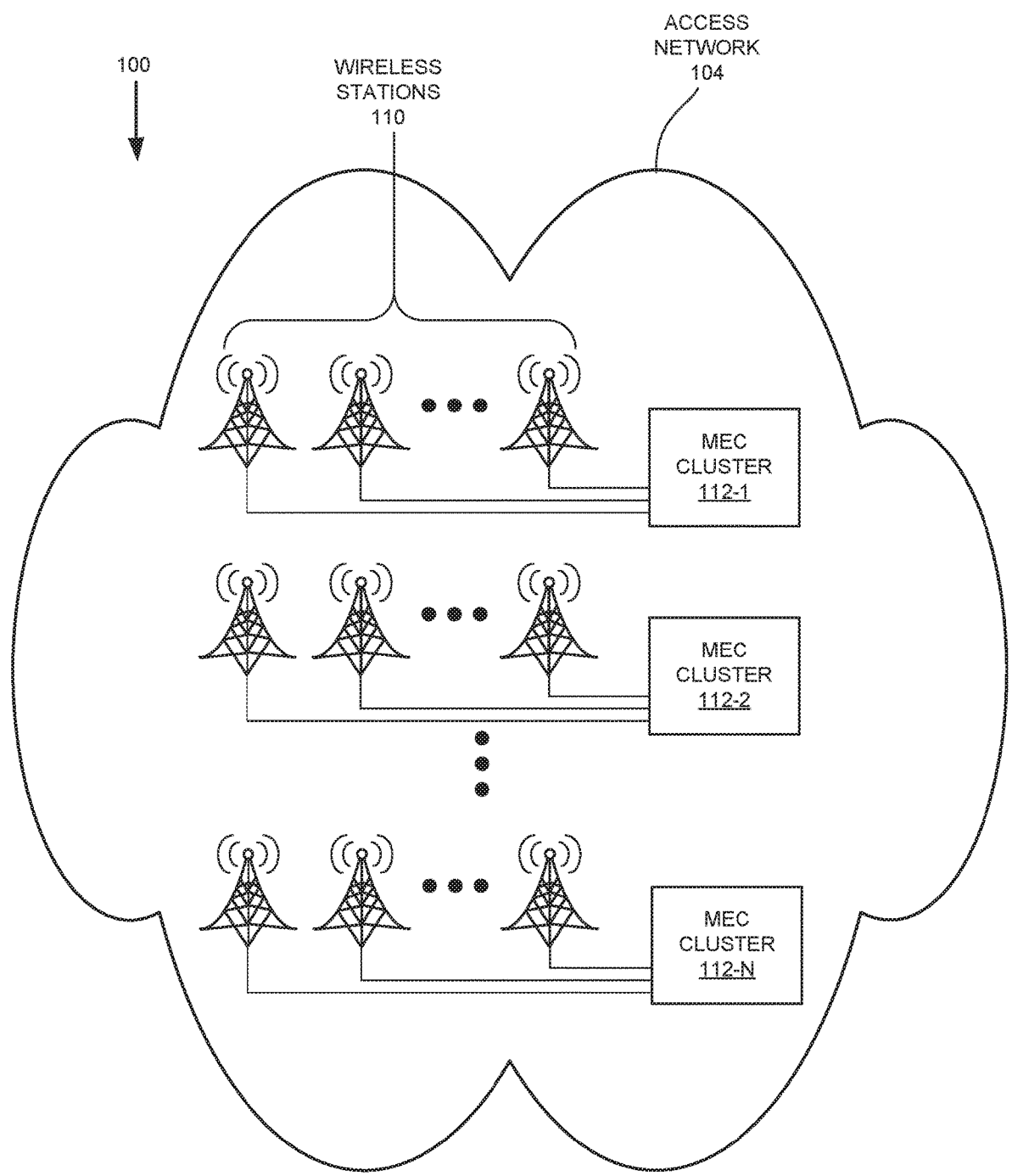
FIG. 1B shows a portion of the network environment of FIG. 1A in greater detail.

FIG. 1B illustrates a portion of network environment 100 of FIG. 1A in greater detail. In FIG. 1B, access network 104 is shown as including multiple MEC clusters 112-1 through 112-N, each of which may be coupled to a group of wireless stations 110. As noted above, each MEC cluster (e.g., 112-1, 112-2, . . . 112-N) may be geographically close to the corresponding set of wireless stations 110, such that a particular MEC cluster 112-x and the corresponding wireless stations 110 can provide services to UE devices 102 (which are wirelessly linked to access network 104 via wireless stations 110) with minimal latency.

Depending on the implementation, network environment 100 may include networks other than those illustrated in FIGS. 1A and 1B. Furthermore, for simplicity, FIGS. 1A and 1B do not show all components that may be included in network environment 100 (e.g., routers, bridges, wireless access point, additional UE devices, additional wireless stations, etc.).

Figure 2:
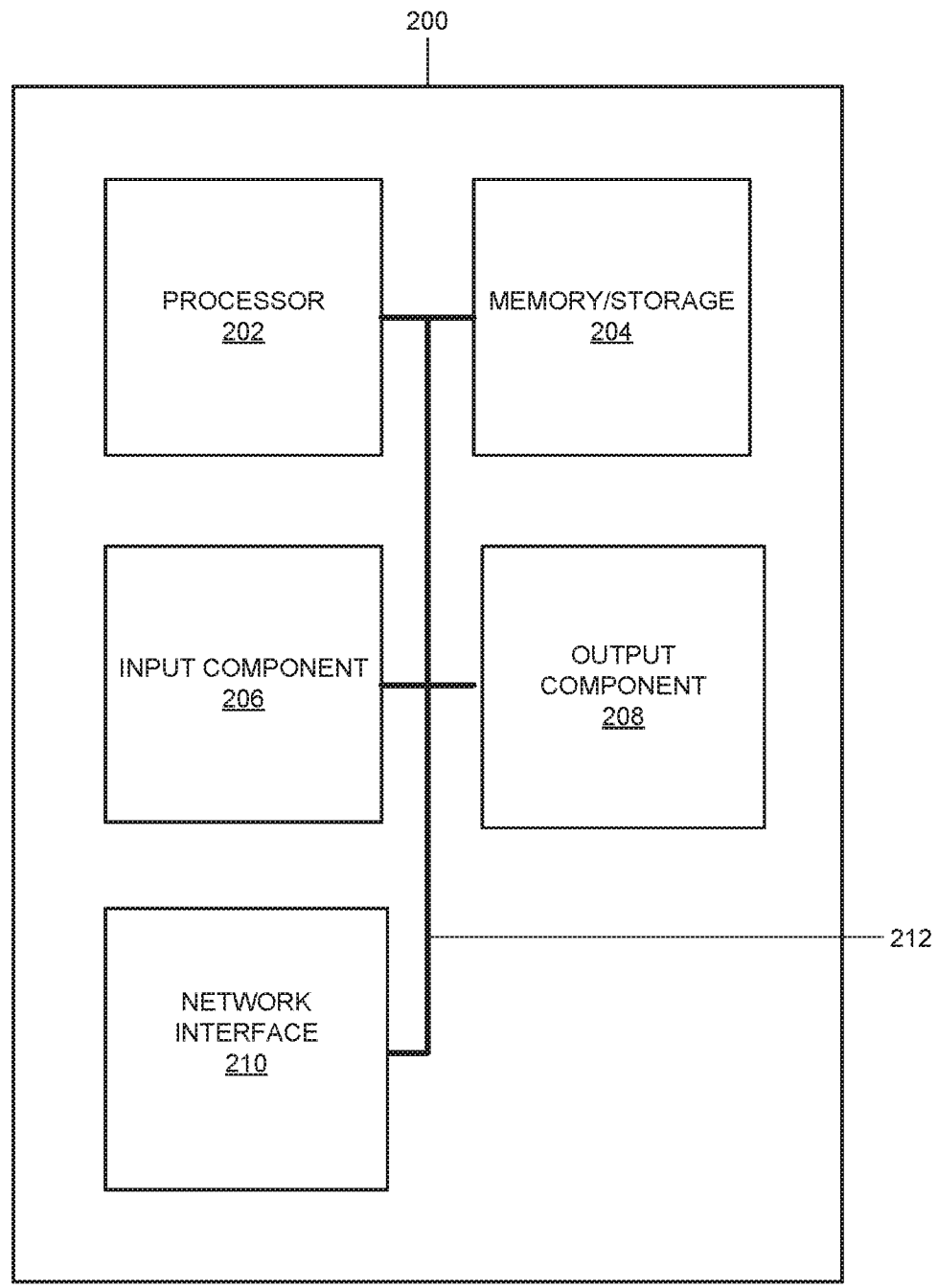
FIG. 2 depicts exemplary components of an exemplary device.

FIG. 2 depicts exemplary components of an exemplary device 200. Device 200 may correspond to or may be included in any of components of FIG. 1A and FIG. 1B (e.g., UE device 102, a router, a network switch, servers, gateways, devices in MEC clusters 112, etc.). As shown, device 200 may include a processor 202, memory/storage 204, input component 206, output component 208, network interface 210, and communication path 212. In different implementations, device 200 may include additional, fewer, different, or a different arrangement of components than the ones illustrated in FIG. 2. For example, device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200.

Input/output components 206 and 208 may include a display screen, a keyboard, a mouse, a speaker, a microphone, a camera, a DVD reader, USB lines, and/or other types of components for obtaining, from physical events or phenomena, to and/or from signals that pertain to device 200.

Network interface 210 may include a transceiver (e.g., a transmitter and a receiver) for device 200 to communicate with other devices and/or systems. For example, via network interface 210, device 200 may communicate over a network, such as the Internet, an intranet, a terrestrial wireless network (e.g., a WLAN, WiFi, WiMax, etc.), a satellite-based network, optical network, etc.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of device 200 to communicate with one another.

Device 200 may perform the operations described herein in response to processor 202 executing software instructions stored in a non-transient computer-readable medium, such as memory/storage 204. The software instructions may be read into memory/storage from another computer-readable medium or from another device via network interface 210. The software instructions stored in memory/storage (e.g., memory/storage 204, when executed by processor 202, may cause processor 202 to perform processes that are described herein.

Figure 3A:
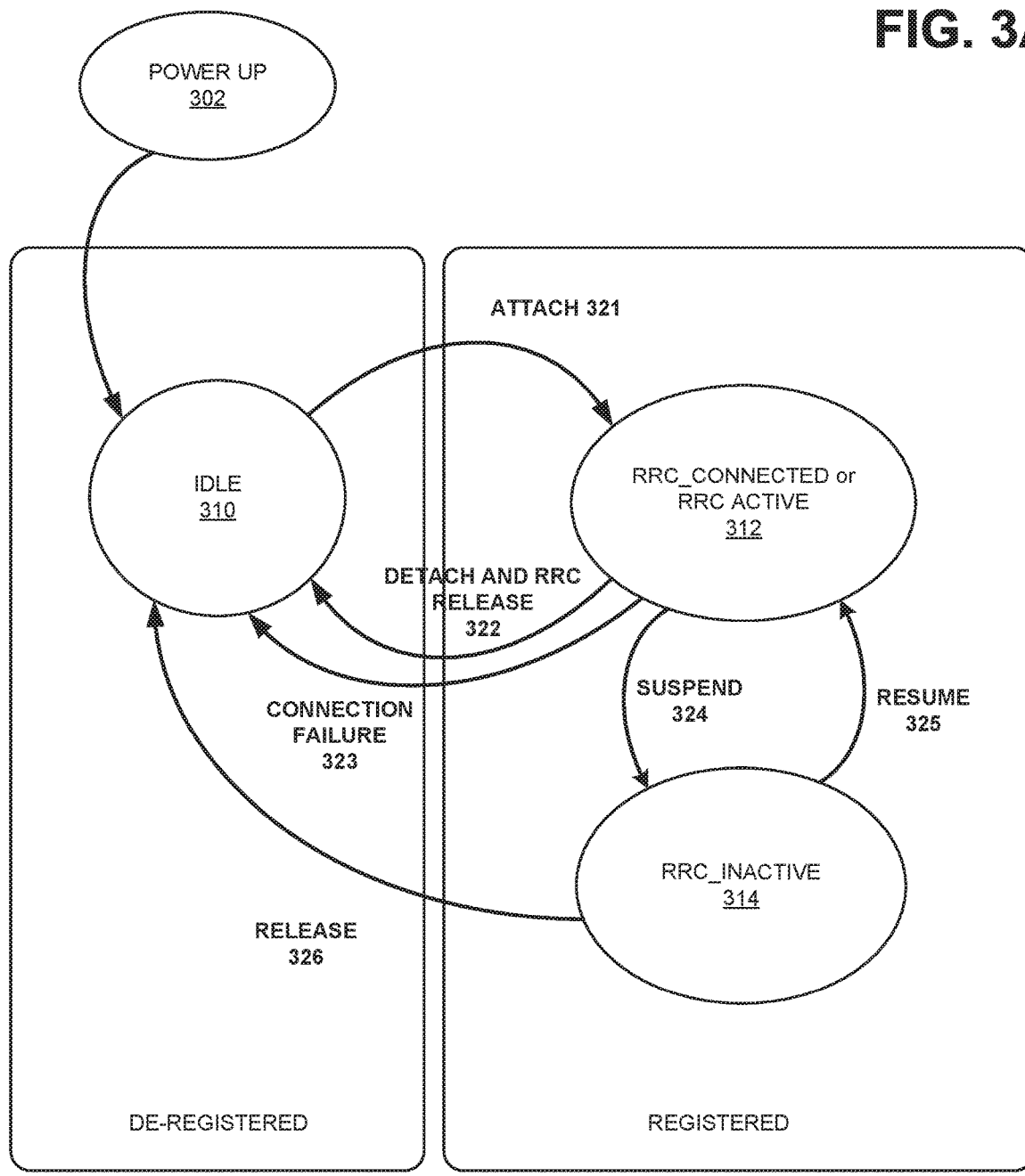
FIG. 3A depicts an exemplary state transition diagram of a User Equipment (UE) device of FIG. 1A according to one implementation.
Figure 3B:
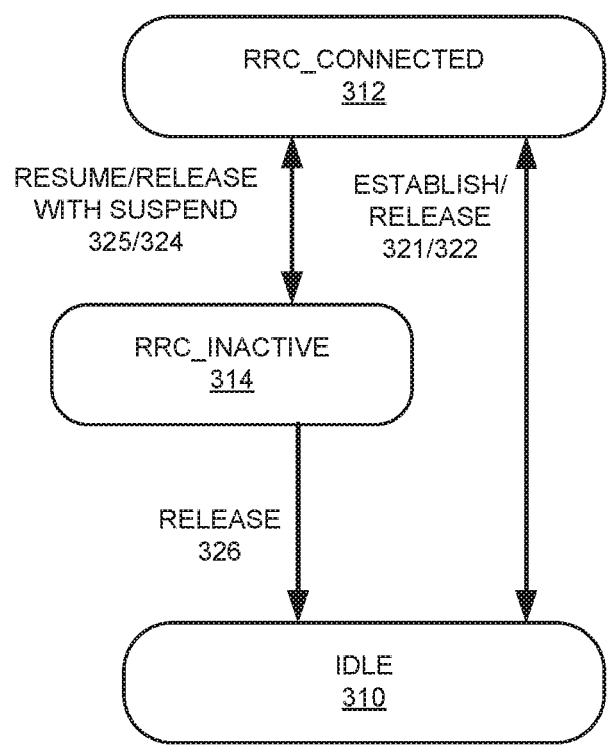
FIG. 3B shows a simplified version of the state transition diagram of FIG. 3A.

FIG. 3A depicts an exemplary state transition diagram of UE device 102 according to one implementation. FIG. 3B shows a simplified version of the state transition diagram of FIG. 3A. As shown in FIGS. 3A and 3B, UE device 102 can be in one of the following states: the POWER UP state 302, the IDLE state 310, the RRC_CONNECTED state (or the "RRC_ACTIVE" state) 312, and the RRC_INACTIVE state 314.

When UE device 102 is powered up, UE device 102 is in POWER UP state 302. UE device 102 then transitions into IDLE state 310, at which point UE device 102 detects signals from a wireless station 110 of access network 104 and makes an attempt to attach 321 to access network 104. If UE device 102 fails to attach (Connection Failure 323) to network 104, UE device 102 returns to or remains in IDLE state 310. Otherwise, UE device 102 transitions to RRC_CONNECTED state 312.

At RRC_CONNECTED state 312, UE device 102 may return to IDLE state 310 by detaching or releasing its connection 322. In addition, UE device 102 may suspend 324 its connection activity (e.g., the user has not touched UE device 102 for a certain amount of time) and enter into RRC INACTIVE state 314. UE device 102 may leave state 314 when UE device 102 resumes 325 its activity (e.g., the user has tapped on the display screen of UE device 102). Alternatively, at state 314, if there is a connection failure, UE device 102 may release 326 its connection and return to IDLE state 310.

At RRC_INACTIVE state 314, UE device 102 may be capable for performing several actions. These include, for example, selecting a Public Land Mobile Network (PLMN), receiving system broadcast information, re-selecting cells for the UE device 102, performing Discontinuous Reception (DRX) messaging, or interacting with wireless stations 110 when moving from one wireless station 110 ("first wireless station 110") to another wireless station 110 ("second wireless station 110") (e.g., during a handoff). For the last action, both UE device 102 and the first wireless station 110 may store an Access Strata (AS) context. When UE device 102 moves from the first wireless station 110 to the second wireless station 110 in RRC_INACTIVE state 314, UE device 102 may set up a new connection to the second wireless station 110. The second wireless station 110 may then obtain the AS context from the first wireless station 110. UE device 102 can update the connection to the second wireless station 110 in accordance with the RAN-based Notification Area (RNA) procedure.

In transitioning from one state to another state, UE device 102 may interact with access network 104 and wireless station 110, via additional signaling. During the state transitions, MEC clusters 112 that are coupled to wireless station 110 (to which the UE device 102 is linked) may participate in the signaling process. MEC cluster 112 has higher computational capabilities and may offload work from one device within the cluster 112 to another device in the cluster 112, or alternatively, from the MEC cluster 112 to another MEC cluster 112, as the computational load on MEC clusters 112 are dynamically configurable. MEC clusters 112 may share UE device connection contexts or UE device state information.

As shown in FIG. 3A, when UE device 102 is in IDLE state 310, UE device 102 is de-registered with respect to access network 104. When UE device 102 is in RRC_CONNECTED state 312 or RRC_INACTIVE state 314, UE device 102 is registered with access network 104.

Figure 4A:
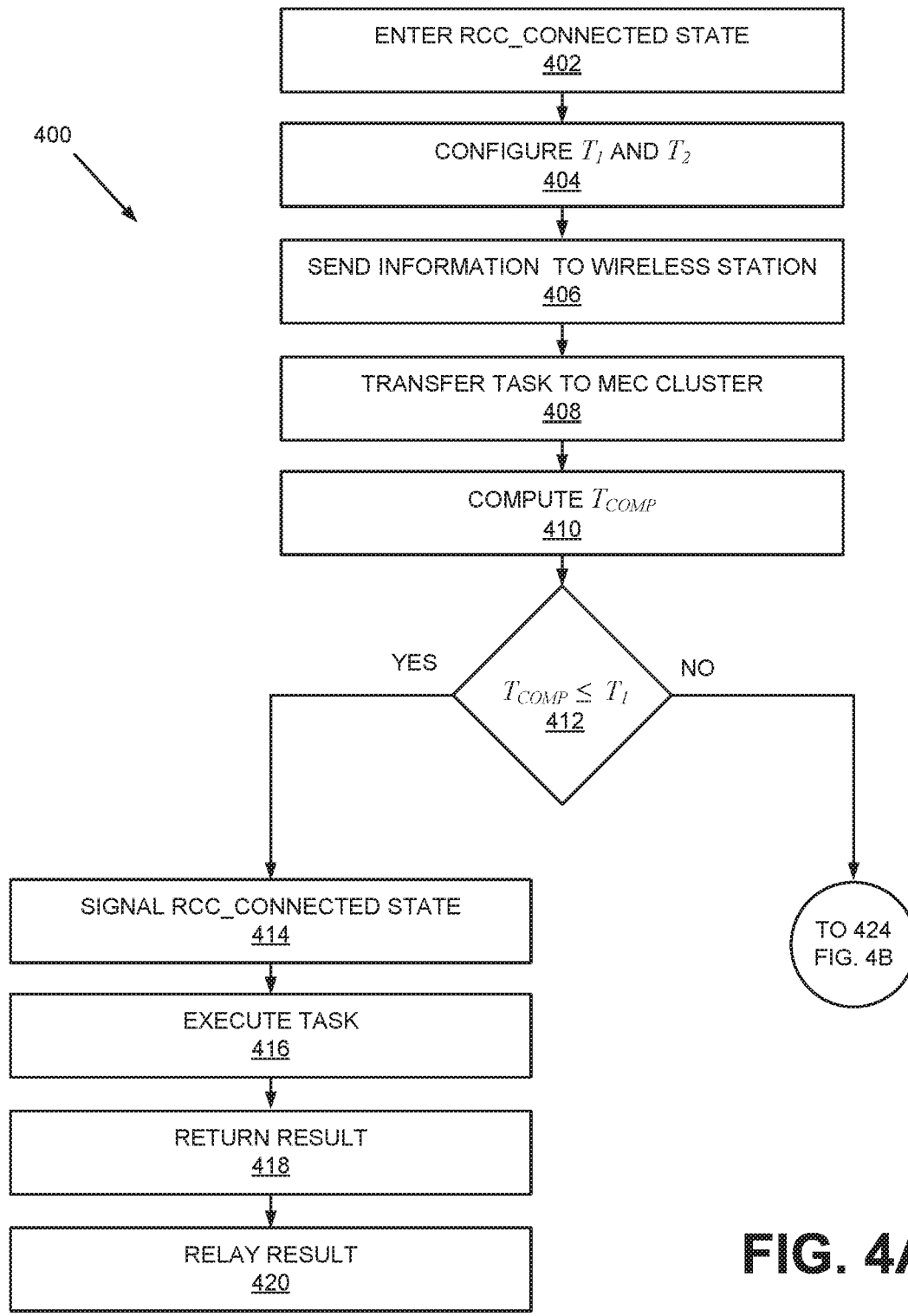
FIGS. 4A-4C depict a flow diagram of an exemplary process that is associated with MEC clusters of FIG. 1A or 1B assisting a UE device of FIG. 1A to make operational state transitions.
Figure 4B:
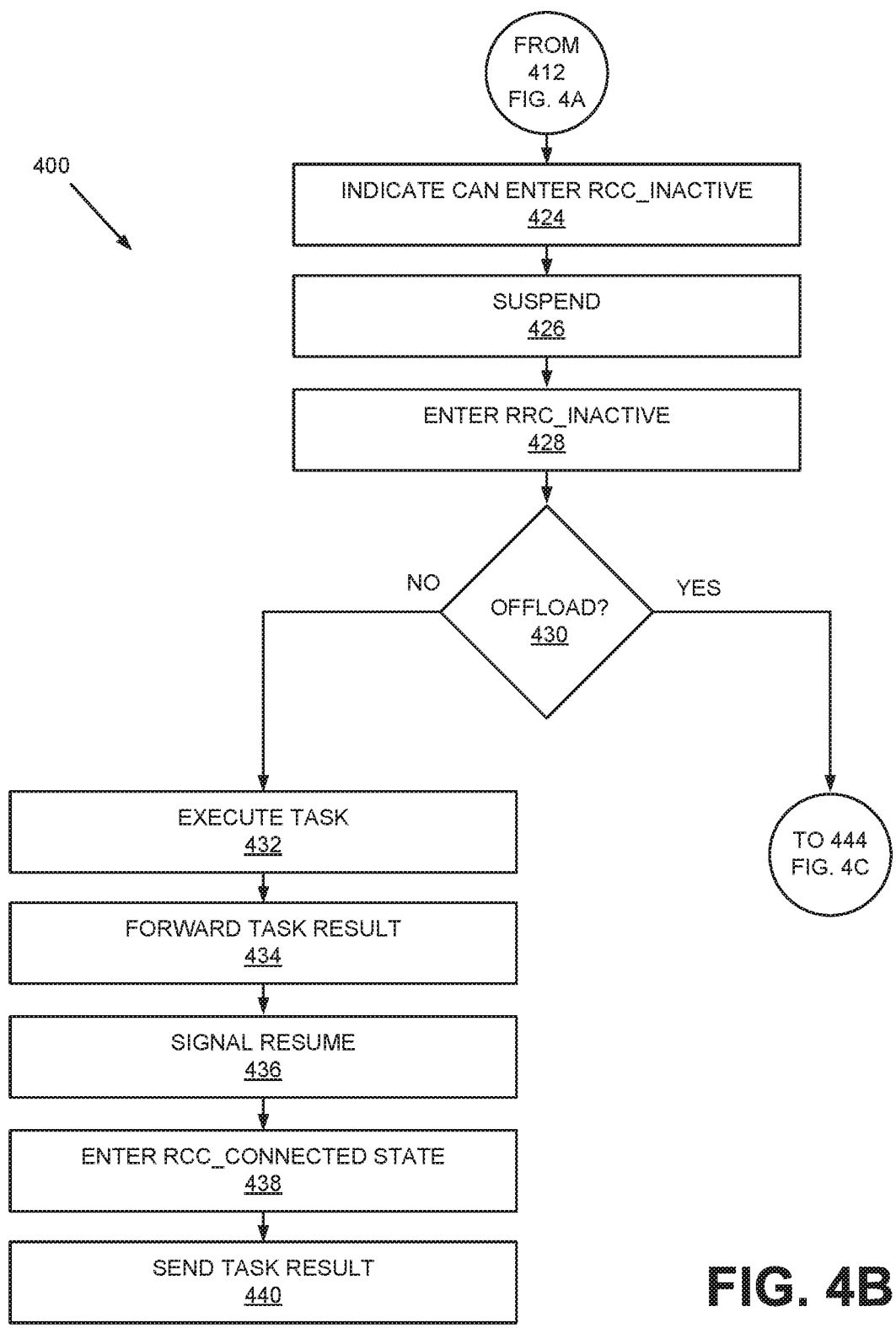
Figure 4C:
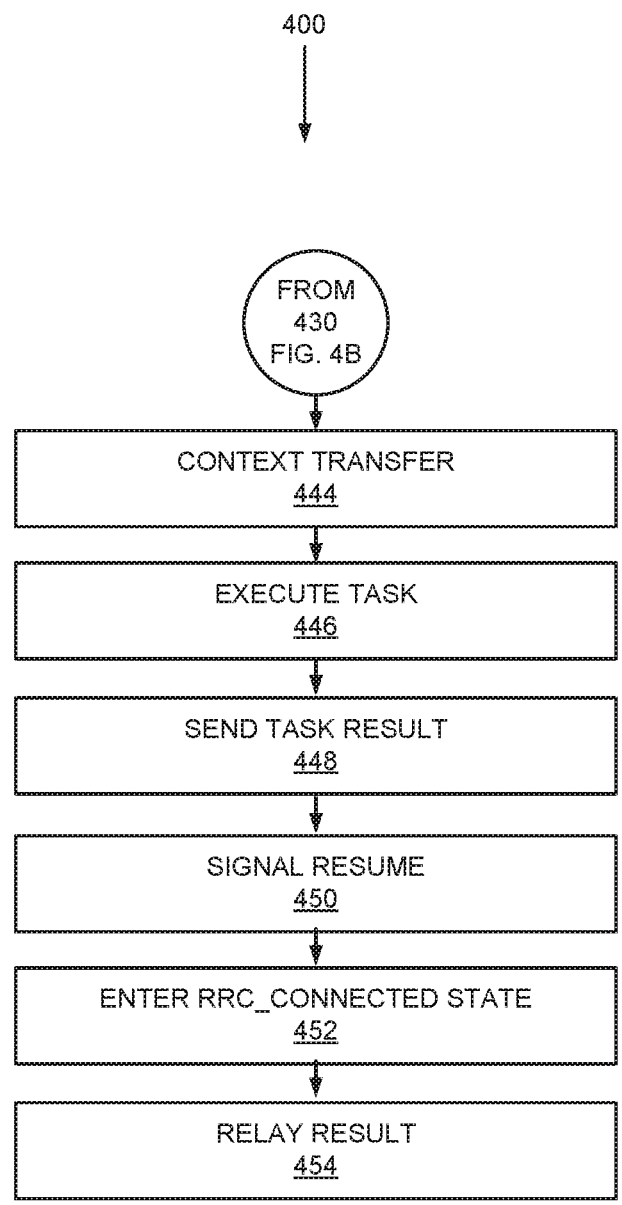
Figure 5A:
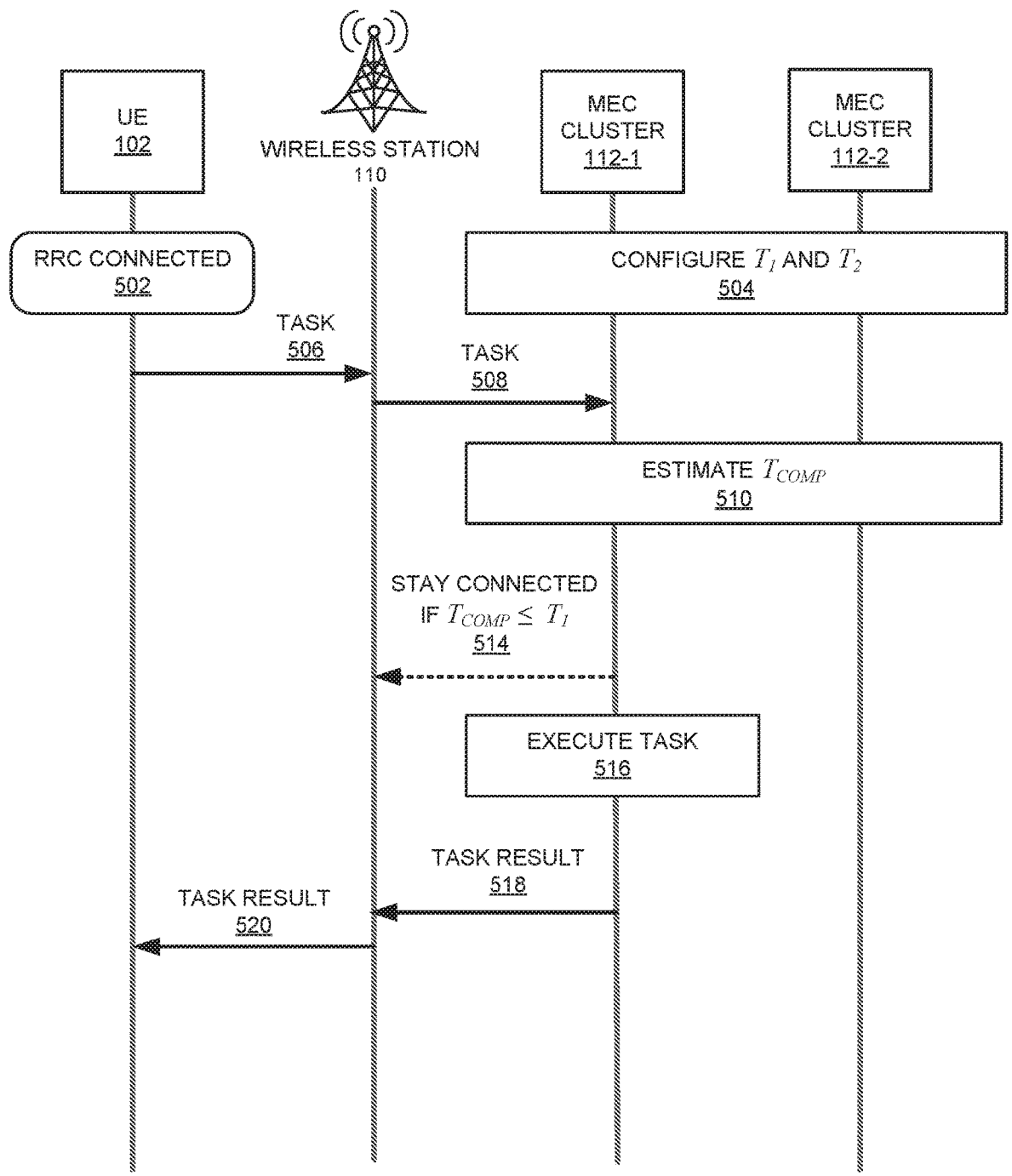
FIGS. 5A-5C are signal flow diagrams illustrating communications between the network components of FIGS. 1A and 1B and actions performed by the network components during the process of FIGS. 4A-4C.
Figure 5B:
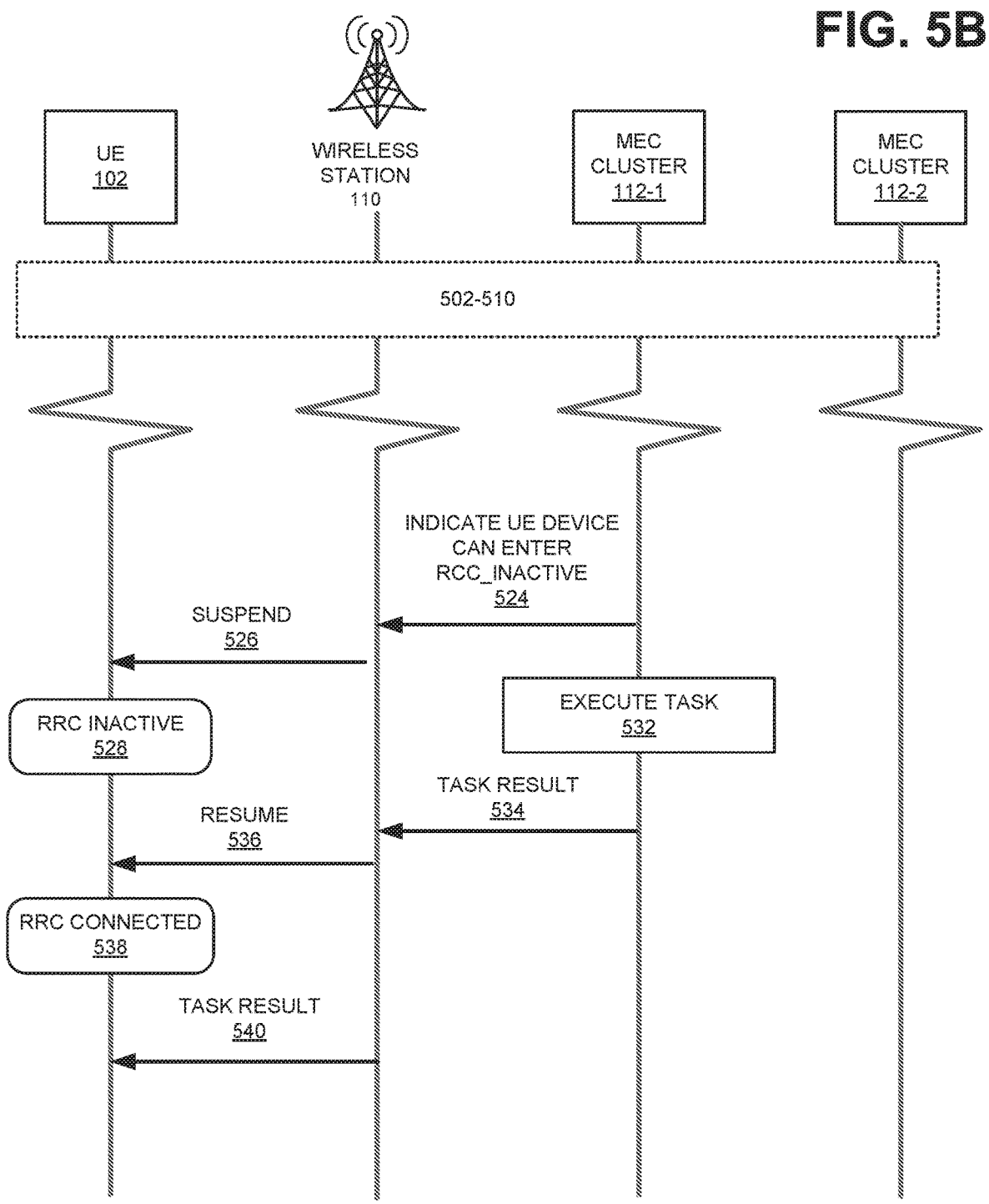
Figure 5C:
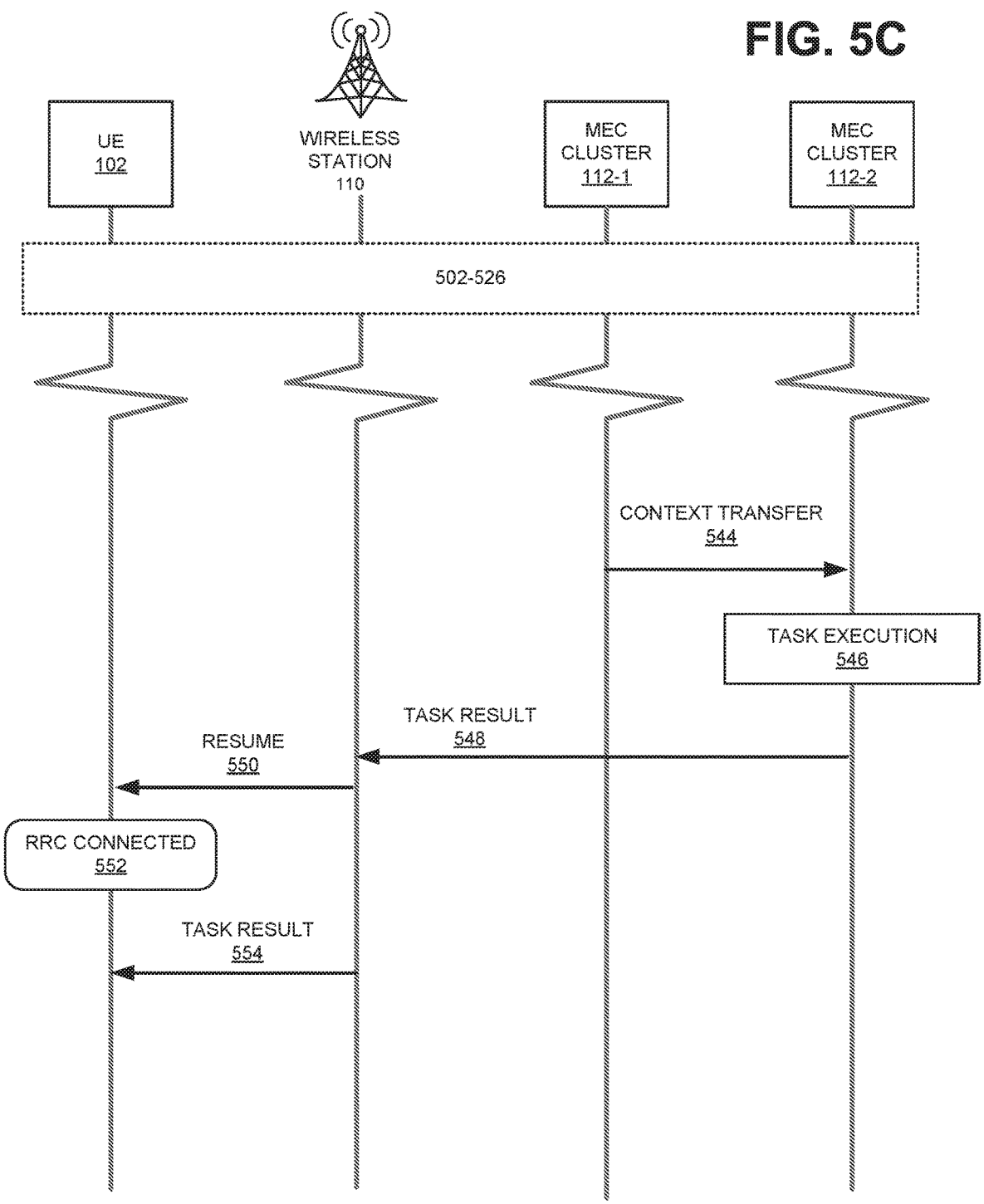

FIG. 4A-4C depict a flow diagram of an exemplary process 400 that is associated with MEC clusters 112 assisting a UE device 102 to make operational state transitions. FIGS. 5A-5C are signal flow diagrams illustrating communications between components of network environment 100 and actions performed by the components during process 400. The network components may be implemented with one or more devices 200 executing computer instructions. For example, according to one implementation, a UE device 102, a wireless stations 110, MEC cluster 112-1, and/or MEC cluster 112-2 may perform process 400.

As shown in FIG. 4A, process 400 may include UE device 102 entering RRC_CONNECTED state 312 (block 402 and item 502). As discussed above, UE device 102 may enter RRC_CONNECTED state 312 from RRC_INACTIVE state 314 via resume arc 325 or from IDLE state 310 by detecting network system broadcast signals and attaching 321.

MEC cluster 112-1, which is associated with the wireless station 110 to which UE device 102 is attached, and MEC cluster 112-2 may configure two parameters, $T_1$ and $T_2$ (block 404; item 504). $T_1$ denotes a time interval (i.e., a threshold) within which if the MEC clusters 112 complete a task associated with the UE device 102, UE device 102 may enter or remain in RRC_CONNECTED state 312. That is, on one hand, if the MEC clusters 112 finish the task quickly (i.e., $<T_1$), UE device 102 may immediately take its next action without having to wait (i.e., without entering RRC_INACTIVE state 314). On the other hand, if the MEC clusters 112 spend a long time to finish the task for the UE device 102 (i.e., $>T_1$), UE device 102 should enter RRC_INACTIVE state 314 while waiting for the MEC clusters 112, to save power. $T_2$ includes a time for which UE device 102 context may be retained at MEC clusters 112 for performing the task associated with the UE device 102. Depending on the implementation, $T_1$ and $T_2$ may be set in various ways, such as for example, by a network operator, by UE device 102, by MEC clusters 112, by wireless stations 110, by access network 104, etc., based on overall energy savings or signal savings observed from monitoring UE devices 102, wireless stations 110, MEC clusters 112, access network 104, core network 106, etc.

UE device 102 sends information, to the wireless station 110 to which the UE device 102 is attached, which results in a task to be performed by the wireless station 110 and/or access network 104 (block 406; arrow 506). The task may include a lower-network layer task and/or higher layer task (e.g., an application related task). Furthermore, upon receipt of the information, the wireless station 110 may spinoff or transfer the task to the MEC cluster 112-1, to which wireless station 110 is coupled (block 408; arrow 508).

MEC cluster 112-1 may determine an estimated time $T_{COMP}$ to complete the task (block 410; block 510), and compare the estimated time $T_{COMP}$ to $T_1$ (block 412). In determining $T_{COMP}$, MEC cluster 112-1 may take into consideration multiple factors, such as a number of resources available to MEC cluster 112-1, a number of threads that can be allocated to work on the task in parallel, how long it would take MEC clusters 112 to complete the task if MEC cluster 112-1 were to transfer the task to MEC cluster 112-2, the time MEC cluster 112-1 may take to transfer the task to MEC cluster 112-2, etc.

At block 412, if MEC cluster determines that $T_{COMP} \leq T_1$ (block 412: YES), MEC cluster 112-1 may indicate to the wireless station that the UE device 102 should stay in RRC_CONNECTED state 312 (block 414; dotted arrow 514) and proceed to complete the task (block 416; block 516). When the task is complete, MEC cluster 112-1 may provide the result of the completed task to the wireless station 110 (block 418; arrow 518), which may relay the result to UE device 102 (block 420; arrow 520).

At block 412, if MEC cluster does not determine that $T_{COMP} \leq T_1$ (i.e., $T_{COMP} > T_1$) (block 412: NO), process 400 may proceed to block 424 (FIG. 4B). At block 424, MEC cluster 112-1 sends a message to the wireless station 110, indicating that UE device 102 can enter RRC_INACTIVE state 314 (block 424; arrow 524). In response, the wireless station 110 advises UE device 102 to suspend (block 426; arrow 526). Consequently, UE device 102 enters RRC_INACTIVE state 314 (block 428; rounded rectangle 528).

MEC cluster 112-1 determines whether to offload the task to MEC cluster 112-2 (block 430). In making the determination, MEC cluster 112-1 may take into consideration various factors, such as whether the sum of the time that MEC cluster 112-2 needs to complete the task, the time required to transfer the task from MEC cluster 112-1 to MEC cluster 112-2 ($T_{MEC2MEC}$), the time MEC cluster 112-1 needs to complete the task, etc. MEC cluster 112-1 may also estimate the potential path of the next hop (from the MEC cluster 112-1) based on the application type or any information UE device 102 provides.

At block 430, if MEC cluster 112-1 determines not to transfer the task (block 430: NO), MEC cluster 112-1 may execute the task (block 432; block 532) and forward/return the result of completing the task to the wireless station 110 (block 434; arrow 534). Upon receiving the result of the task, the wireless station 110 signals to UE device 102 to resume (block 436; arrow 536). In response to the signal, UE device 102 enters RRC_CONNECTED state 312 (block 438; block 538). The wireless station 110 may then send the result of the task (which it received from MEC cluster 112-1) to UE device 102 (block 440; arrow 540).

Referring back to block 430, if MEC cluster 112-1 determines to transfer the task (block 430: YES), process 400 may proceed to block 444 (FIG. 4C), where MEC cluster 112-1 transfers the context of the task to MEC cluster 112-2 and/or any compute results, to request MEC cluster 112-2 to perform the task (block 444; arrow 544).

When MEC cluster 112-2 receives the context and the task request, MEC cluster 112-2 executes the task (block 446; block 546). When MEC cluster 112-2 completes the task, MEC cluster 112-2 forwards/sends the task result to the wireless station 110 (block 448; arrow 548).

In the preceding blocks, $T_2$ is used to determine for how long the UE context is to be kept. MEC cluster 112-1 or MEC cluster 112-2 may keep the compute results and context for the UE device 102 for $T_2$ interval. If the UE device 102 does not resume the connection before $T_2$ expires, MEC clusters 112 will discard the UE context.

When the wireless station 110 receives the task result from MEC cluster 112-2, the wireless station 110 signals to UE device 102 to resume (block 450; arrow 550). In response, UE device 102 enters RRC_CONNECTED state 312 (block 452; rounded rectangle 552). The wireless station 110 then forwards the result it received from MEC cluster 112-2 to UE device 102 (block 454; arrow 554).

In process 400, when MEC clusters 112 compute or estimate $T_{COMP}$ at block 410 or performs the task at block 416, 432, or 446, MEC clusters 112 may manage their computational resources (i.e., processors, processor cores, processor time, memory, etc.). In some implementations, MEC clusters 112 may attempt to finish the task as quickly as possible given the resources. In other implementations, when given an estimate of the time duration for which UE device 102 is to remain in RRC_INACTIVE state 314, MEC clusters 112 may optimize its resource utilization. To optimize their resources, MEC clusters 112 may use or take into consideration (e.g., calculate) a number of network or computation-related parameters. FIG. 6 shows a table of exemplary parameters that MEC clusters 112 may use or take into consideration, to dynamically allocate their resources to optimally perform tasks that are associated with UE device 102 state transitions. A number of these parameters already have been discussed above with reference to FIGS. 4A-4C and 5A-5C.

As shown in FIG. 6, the parameters may include $T_{UR}$, $T_N$, $T_{COMP}$, $T_{COMP}(n)$, $N_T$, $T_{UL}$, $T_{DL}$, $T_{MEC2MEC}$, $T_L$, $T_1$, $T_2$, $N_R$, $R_{COMP}(n)$, and $R_{COMP}$. $T_{UR}$ may indicate an estimated time until the UE device 102 makes the next request that will be processed by the MEC cluster 112. UE device 102 may provide $T_{UR}$ or information from which $T_{UR}$ can be obtained. $T_N$ may indicate an estimated time until the UE device 102 makes the next request that will require the MEC cluster 112 to allocate a resource. UE device 102 may provide $T_N$ or may provide information from which $T_N$ can be obtained. $T_{COMP}$, as discussed above, may indicate an estimated time for the MEC clusters 112 to complete the task associated with UE device 102. The task may have resulted from a message from UE device 102. MEC cluster 112 that is coupled to the wireless station 110 to which the UE device 102 is attached may compute $T_{COMP}$, based on various factors, such as the history of computations resulting from UE device messages, $T_{COMP}(n)$, etc.

$T_{COMP}(n)$ denotes an estimated time for the n-th thread in the MEC cluster 112 to perform its portion of a task associated with UE device 102 as the result of a message from the UE device 102. $N_T$ is the total number of threads allocated for the task at a MEC cluster 112 or is the maximum number of threads that can be allocated for the task associated with the UE device 102. Accordingly, $T_{COMP}$ and $T_{COMP}(n)$ are related by:

$$T_{COMP} = \max_{0 \leq n \leq N_T} T_{COMP}(n) \qquad (1)$$

That is, $T_{COMP}$ is the maximum of the times that each $N_T$ threads take to perform their portions of the task. The $N_T$ threads run concurrently.

$T_{UL}$ and $T_{DL}$ are uplink and downlink network latencies. $T_{MEC2MEC}$ is the time to transfer a task from one MEC cluster 112 to another MEC cluster 112 (e.g., task/transfer latency). $T_L$ is the overall network latency. $T_1$, as discussed above, is a threshold for determining whether to place the UE device 102 in RRC_INACTIVE state 314, $T_2$ is the time for which the UE device context may be retained by the MEC clusters 112.

$N_R$ is the number of resources available to the MEC cluster 112 to complete the task associated with UE device 102. $R_{COMP}(n)$ is the number of resources needed by a n-th thread to perform its portion of the task and $R_{COMP}$ is the total number of resources needed by the threads of the task. Then, $R_{COMP}(n)$ and $R_{COMP}$ are related by the following expression:

$$R_{COMP} = \sum_{n=1}^{N_T} R_{COMP}(n) \qquad (2)$$

Figure 7A:
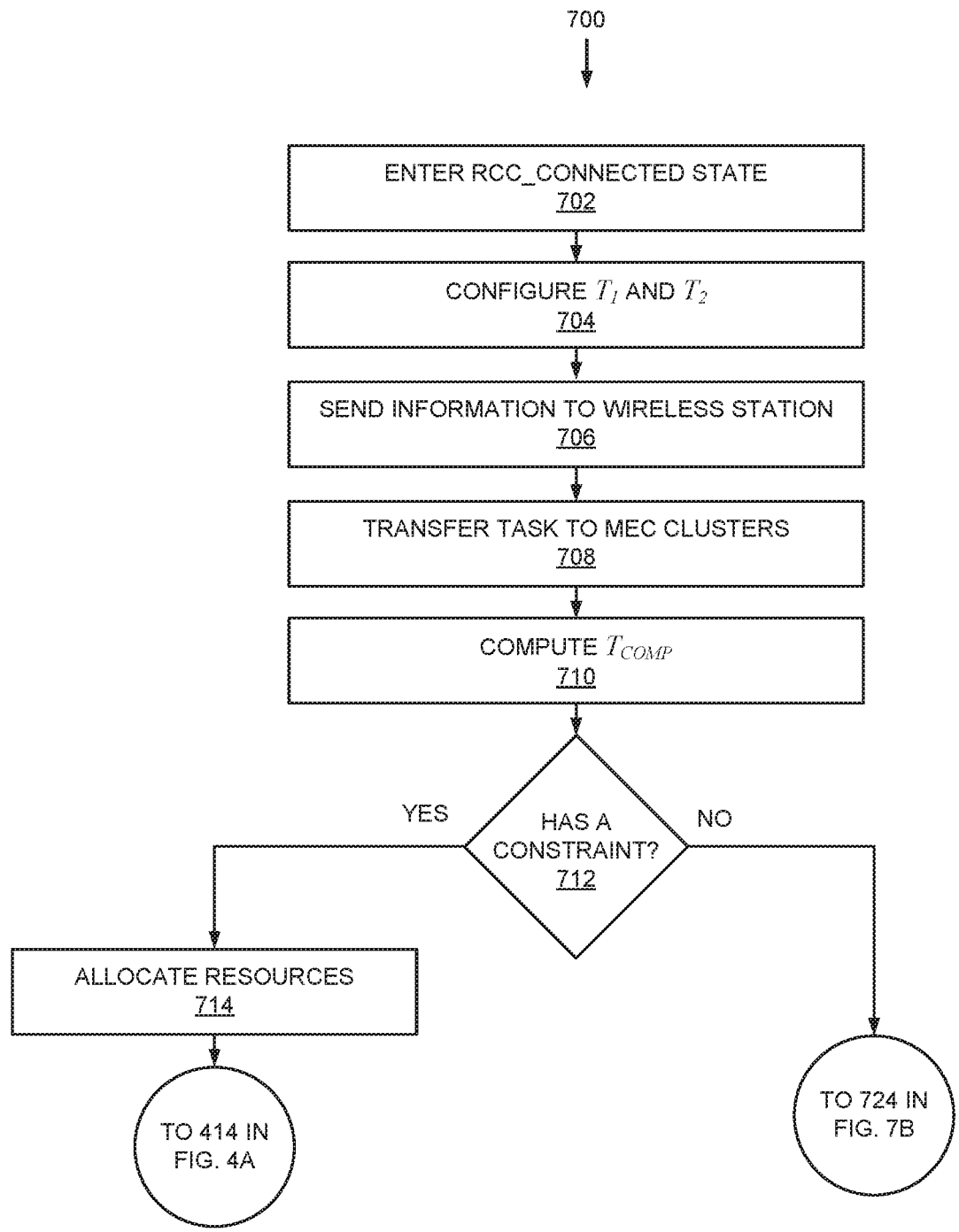
FIGS. 7A and 7B illustrate a flow diagram of an exemplary process that is associated with allocating resources at a MEC cluster of FIG. 1A or 1B to optimally perform a task that is associated with state transitions of a UE device of FIG. 1A.
Figure 7B:
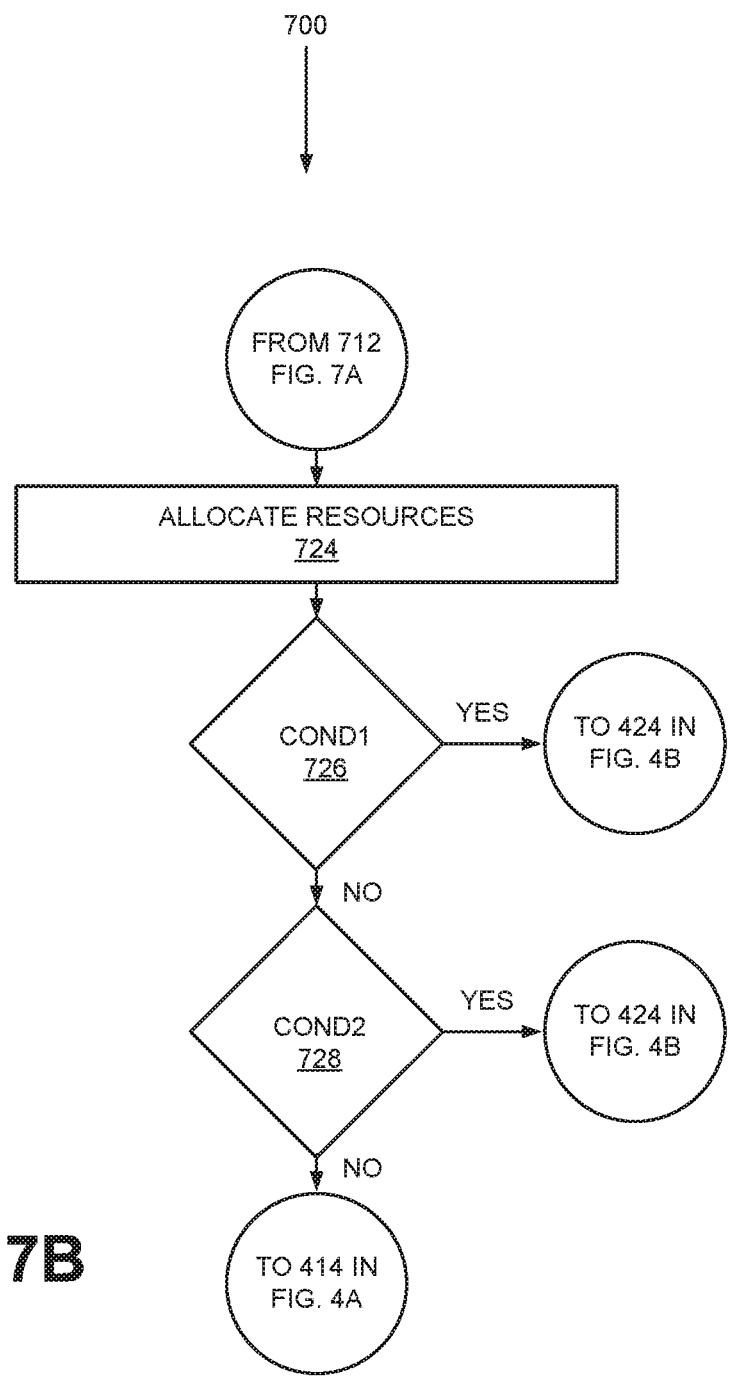

FIGS. 7A and 7B illustrate a flow diagram an exemplary process 700 that is associated with allocating resources at MEC cluster 112 to complete a task that is associated with the UE device 102. A quick completion of the task may allow the UE device 102 to enter the RRC_INACTIVE state 314.

As shown in FIG. 7A, process 700 may include a UE device 102 entering RRC_CONNECTED state 312 (block 702), MEC clusters 112 configuring $T_1$ and $T_2$ (block 704), UE device 102 sending information (which may result in a task at MEC clusters 112) to the wireless station 110 (block 706), generating/transferring the task at MEC clusters 112 (block 708), and determining $T_{COMP}$ at MEC clusters 112 (block 710). These actions performed by the network components at blocks 702-710 are similar to the actions performed at blocks 402-410 in process 400 of FIG. 4A.

At block 712, process 700 may include the MEC cluster 112 determining whether the MEC clusters 112 have a constraint on their resources (block 712) (e.g., a limited number of processors, processor cores, or memory). If the MEC clusters 112 are resource constrained (block 712: YES), the MEC clusters 112 may allocate resources to perform the task (block 714), such that the following conditions are satisfied:

(A) $T_1 < T_{UR}$ (the current MEC task will complete before the next MEC request);

(B) $T_{COMP} + T_{MEC2MEC} < T_{UR}$ (the task on the target MEC clusters 112 will complete before the next MEC request); and/or (C) $T_{COMP} + T_{NETUL} + T_{NETDL} < T_L$ (the MEC clusters 112 compute time plus round-trip network latency is less than total end-to-end latency $T_L$ requested by the UE device 102).

After allocating the resources in accordance with the conditions (A)-(C), process 700 may proceed to block 414 of process 400 (FIG. 4A), which is associated with handling/signaling RRC_INACTIVE state 312 at UE device 102.

Returning to block 712, if the MEC clusters 112 are not resource constrained (block 712: NO), process 700 may proceed to block 724 in FIG. 7B to allocate enough resources to finish the task quickly (block 724).

At block 726, the MEC cluster 112 may determine whether a particular condition ("COND1") is satisfied. COND1 represents the condition in which $T_{COMP} < T_{UR}$ and $T_N \geq T_{UR}$. If COND1 is satisfied (block 726: YES), then the MEC clusters 112 may proceed to block 424 of process 400, to signal that UE device 102 can enter the RRC_INACTIVE state 314 (FIG. 4B). If COND1 is not satisfied (block 726: NO), the MEC cluster 112 may determine whether another condition ("COND2") is satisfied (block 728). COND2 represents the condition in which $T_N \leq T_{UR}$, $T_N \geq T_1$, and $T_{COMP} < T_N$. If COND2 is satisfied (block 728: YES), the MEC clusters 112 may proceed to block 424 of process 400 to signal that UE device 102 can enter RRC_INACTIVE state 314 (FIG. 4B). If COND2 is not satisfied (block 728: NO), the MEC clusters 112 may proceed to block 414 of process 400 in FIG. 4A to signal that UE device 102 can remain/enter the RRC_CONNECTED state 312.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 4A-4C, 7A, and 7B, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device in a first Multi-Access Edge Computing (MEC) cluster in a network, comprising: one or more processors configured to: receive, from a wireless station, information associated with a User Equipment (UE) device that is wirelessly attached to the network through the wireless station;
determine an estimate of a time interval to complete a task for the UE device based on the information; when the estimate is less than a threshold time interval: send a message, through the wireless station, which indicates to the UE device to be in a connected state; and execute the task; and when the estimate is greater than the threshold time interval, determine whether to execute the task; and offload the task to another network device in another MEC cluster if the one or more processors determine not to execute the task, wherein the UE device is not included in the network.

2. The network device of claim 1, wherein when the estimate is greater than the threshold time interval, the one or more processors are further configured to: signal to the UE device, through the wireless station, to enter an inactive state if the one or more processors determine to execute the task, execute the task; and forward a result of executing the task to the wireless station.

3. The network device of claim 2, wherein the wireless station is configured to: receive the result forwarded by the network device; signal the UE device to return to the connected state; and relay the result to the UE device.

4. The network device of claim 2, wherein when the one or more processors offload the task, the one or more processors are configured to: transfer a context associated with the UE device to the other network device.

5. The network device of claim 4, wherein the other network device is to: receive the context from the network device; execute the task; and forward a result of the task to the wireless station, and wherein the wireless station is to: receive the result forwarded by the other network device; signal the UE device to return to the connected state; and relay the result to the UE device.

6. The network device of claim 1, wherein the network device is located to minimize latency for the UE device.

7. The network device of claim 1, wherein when the one or more processors determine the estimate, the one or more processors are configured to: determine a maximum value among a plurality of estimated time intervals corresponding to a plurality of threads associated with the task, wherein each of the plurality of estimated time intervals is a time that a corresponding thread, among the plurality of threads, takes to complete a portion of the task.

8. The network device of claim 7, wherein each of the plurality of threads uses one or more resources, wherein each of the resources includes a processor core.

9. The network device of claim 1, wherein the one or more processors are further configured to: determine another interval after which the network device is to discard a context associated with the UE device.

10. The network device of claim 1, wherein a radio access network includes the wireless station and the network device, and wherein the network device is coupled to the wireless station.

11. A method comprising: receiving, by a network device in a Multi-Access Edge Computing (MEC) cluster in a network, from a wireless station, information associated with a User Equipment (UE) device that is wirelessly attached to the network through the wireless station; determining an estimate, by the network device, of a time interval to complete a task for the UE device based on the information; and when the estimate is less than a threshold time interval, performing by the network device: sending a message, through the wireless station, which indicates to the UE device to be in a connected state; and executing the task; and when the estimate is greater than the threshold time interval, performing by the network device: determining whether to execute the task; and offloading the task to another network device in another MEC cluster if the network device determines not to execute the task, wherein the UE device is not included in the network.

12. The method of claim 11, wherein when the estimate is greater than the threshold time interval, performing by the network device further includes: signaling, through the wireless station, to the UE device to enter an inactive state; if the network device determines to execute the task: executing the task; and forwarding a result of executing the task to the wireless station.

13. The method of claim 12, wherein the wireless station is configured to: receive the result forwarded by the network device; signal the UE device to return to the connected state; and relay the result to the UE device.

14. The method of claim 12, wherein when the network device determines to offload the task, performing by the network device further includes: transferring a context associated with the UE device to the other network device.

15. The method of claim 14, wherein the other device is to: receive the context transferred from the network device; execute the task; and forward a result of the task to the wireless station, and wherein the wireless station is to: receive the result forwarded by the other network device; signal the UE device to return to the connected state; and relay the result to the UE device.

16. The method of claim 11, wherein the network device is located to minimize latency for the UE device.

17. The method of claim 11, wherein determining the estimate includes: determining a maximum value among a plurality of estimated time intervals corresponding to a plurality of threads associated with the task, wherein each of the plurality of estimated time intervals is a time that a corresponding thread, among the plurality of threads, takes to complete its portion of the task.

18. The method claim 11, further comprising: determining another time interval after which the network device is to discard a context associated with the UE device.

19. A computer-readable medium, comprising computer-executable instructions, which, when executed by one or more processors, cause the one or more processors to: receive, by a network device in a Multi-Access Edge Computer (MEC) cluster in a network and from a wireless station over a backhaul link, information associated with a User Equipment (UE) device that is wirelessly attached to the network through the wireless station; determine an estimate of a time interval to complete a task for the UE device based on the information; when the estimate is less than a threshold time interval, perform: sending a message, through the wireless station, which indicates to the UE device to be in a connected state; and executing the task; and when the estimate is greater than the threshold time interval, perform: determining whether to execute the task; and offloading the task to another network device if the one or more processors determine not to execute the task, wherein the UE device is not included in the network.

20. The computer-readable medium of claim 19, wherein when the estimate is greater than the threshold time interval, the instructions further cause the one or more processors to perform: signaling, through the wireless station, to the UE device to enter an inactive state; if the one or more processors determine to execute the task, executing the task if the one or more processors determines to execute the task; and forwarding a result of executing the task to the wireless station.

* * * * *